(12) United States Patent
Lu

(10) Patent No.: US 11,345,251 B2
(45) Date of Patent: May 31, 2022

(54) PRIORITY-BASED ENERGY TRANSFER

(71) Applicant: TOYOTA MOTOR NORTH AMERICA, INC., Plano, TX (US)

(72) Inventor: Norman Lu, Fairview, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 39 days.

(21) Appl. No.: 16/909,551

(22) Filed: Jun. 23, 2020

(65) Prior Publication Data
US 2021/0394634 A1 Dec. 23, 2021

(51) Int. Cl.
*B60L 53/62* (2019.01)
*B60L 53/65* (2019.01)
*B60L 53/66* (2019.01)

(52) U.S. Cl.
CPC ............... *B60L 53/62* (2019.02); *B60L 53/65* (2019.02); *B60L 53/66* (2019.02)

(58) Field of Classification Search
CPC ................................................ B60L 53/60–68
See application file for complete search history.

(56) References Cited

U.S. PATENT DOCUMENTS

| | | |
|---|---|---|
| 7,928,693 B2 | 4/2011 | Hafner et al. |
| 8,076,801 B2 | 12/2011 | Karalis et al. |
| 8,169,185 B2 | 5/2012 | Partovi et al. |
| 8,169,186 B1 | 5/2012 | Haddad et al. |
| 8,278,875 B2 | 10/2012 | Hagenmaier, Jr. et al. |
| 8,346,401 B2 | 1/2013 | Pollack et al. |
| 8,933,594 B2 | 1/2015 | Kurs et al. |
| 9,026,347 B2 | 5/2015 | Gadh et al. |
| 9,201,407 B2 | 12/2015 | Baxter et al. |
| 9,322,566 B2 | 4/2016 | Wenzel et al. |
| 9,400,990 B2 | 7/2016 | Genschel et al. |
| 9,493,087 B2 | 11/2016 | Leary |
| 9,545,854 B2 | 1/2017 | Daum et al. |
| 9,727,068 B2 | 8/2017 | Kamel et al. |
| 9,754,300 B2 | 9/2017 | Kempton et al. |
| 9,815,382 B2 | 11/2017 | Penilla et al. |
| 9,845,016 B2 | 12/2017 | Sortomme |
| 9,855,851 B2 | 1/2018 | Blum et al. |
| 10,124,691 B1 | 11/2018 | Failing |
| 10,192,245 B2 | 1/2019 | Khoo et al. |
| 2012/0245750 A1 | 9/2012 | Paul et al. |

(Continued)

FOREIGN PATENT DOCUMENTS

| | | |
|---|---|---|
| CN | 102640380 B | 6/2015 |
| JP | 2019068734 A | 4/2019 |

(Continued)

OTHER PUBLICATIONS

International Search Report and Written Opinion issued in a related International Application No. PCT/US21/35324, dated Aug. 31, 2021.

*Primary Examiner* — David V Henze-Gongola

(57) ABSTRACT

An example operation includes one or more of receiving, by a server, an energy transfer request from a charging station, determining, by the server, a current priority level of the at least one transport within an accessible range of the charging station, and responsive to the current priority level being below a threshold, sending an instruction to the at least one transport to transfer energy to the charging station based on the energy transfer request.

18 Claims, 14 Drawing Sheets

(56) References Cited

U.S. PATENT DOCUMENTS

| | | |
|---|---|---|
| 2014/0049207 A1 | 2/2014 | Nakagawa et al. |
| 2014/0203077 A1 | 7/2014 | Gadh et al. |
| 2015/0061569 A1 | 3/2015 | Alexander et al. |
| 2015/0134188 A1 | 5/2015 | Lowenthal et al. |
| 2019/0033385 A1 | 1/2019 | Karner et al. |
| 2019/0302192 A1 | 10/2019 | Gokyu et al. |
| 2020/0276910 A1* | 9/2020 | Harty .................... B60L 53/665 |
| 2021/0152002 A1 | 5/2021 | Sugino et al. |
| 2021/0199467 A1* | 7/2021 | Bellifemine ............ B60L 53/16 |
| 2021/0213848 A1* | 7/2021 | Sun ........................ G06Q 50/30 |

FOREIGN PATENT DOCUMENTS

| | | |
|---|---|---|
| KR | 101040862 B1 | 6/2011 |
| KR | 101764942 B1 | 8/2017 |

\* cited by examiner

550

PRIORITY-BASED ENERGY TRANSFER

CROSS-REFERENCE TO RELATED APPLICATIONS

This application is related to co-pending U.S. non-provisional patent application entitled, "NEED-BASED ENERGY SHARING" both of which were filed on the same day and each incorporated herein by reference in its entirety.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer located on and/or off the transport.

SUMMARY

One example embodiment provides a method that includes one or more of receiving, by a server, an energy transfer request from a charging station, determining, by the server, a current priority level of the at least one transport within an accessible range of the charging station, and responsive to the current priority level being below a threshold, sending an instruction to the at least one transport to transfer energy to the charging station based on the energy transfer request.

Another example embodiment provides a system that includes a processor and memory, wherein the processor is configured to perform one or more of receive an energy transfer request from a charging station, determine a current priority level of the at least one transport within an accessible range of the charging station, and responsive to the current priority level being below a threshold, send an instruction to the at least one transport to transfer energy to the charging station based on the energy transfer request.

A further example embodiment provides a non-transitory computer readable medium comprising instructions, that when read by a processor, cause the processor to perform one or more of receiving an energy transfer request from a charging station, determining a current priority level of the at least one transport within an accessible range of the charging station, and responsive to the current priority level being below a threshold, sending an instruction to the at least one transport to transfer energy to the charging station based on the energy transfer request.

DETAILED DESCRIPTION

Figure 1:
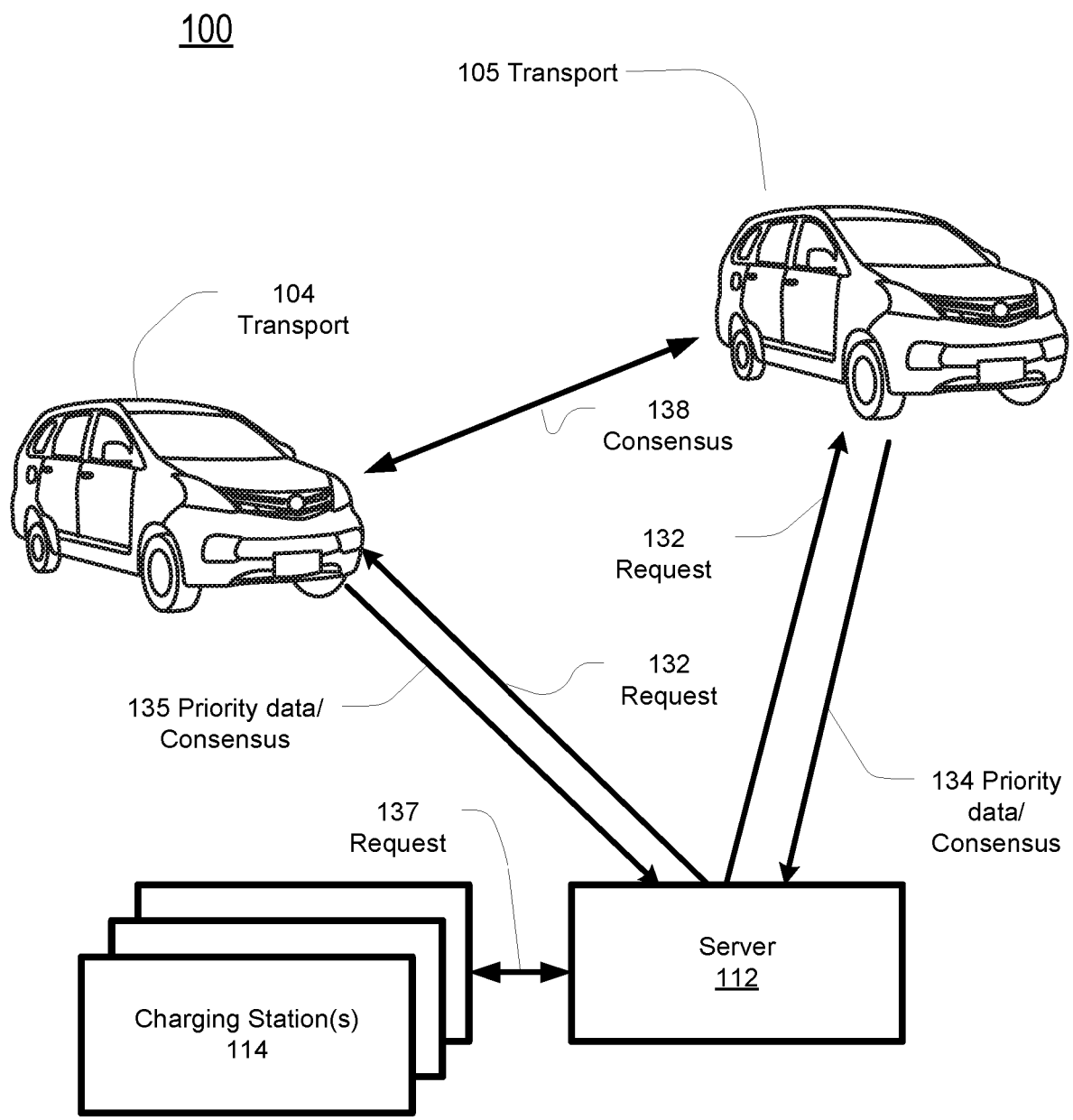
FIG. 1 illustrates a transport network diagram, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current solution, a transport may include one or more of cars, trucks, walking area battery electric vehicle (BEV), e-Palette, fuel cell bus, motorcycles, scooters, bicycles, boats, recreational vehicles, planes, and any object that may be used to transport people and/or goods from one location to another.

In addition, while the term "message" may have been used in the description of embodiments, other types of network data, such as, a packet, frame, datagram, etc. may also be used. Furthermore, while certain types of messages and signaling may be depicted in example embodiments they are not limited to a certain type of message and signaling.

Example embodiments provide methods, systems, components, non-transitory computer readable media, devices, and/or networks, which provide at least one of: a transport (also referred to as a vehicle or car herein), a data collection system, a data monitoring system, a verification system, an authorization system and a vehicle data distribution system. The vehicle status condition data, received in the form of communication messages, such as wireless data network communications and/or wired communication messages, may be processed to identify vehicle/transport status conditions and provide feedback as to the condition and/or changes of a transport. In one example, a user profile may be applied to a particular transport/vehicle to authorize a current vehicle event, service stops at service stations, to authorize subsequent vehicle rental services, and enable vehicle to vehicle communications.

Within the communication infrastructure, a decentralized database is a distributed storage system, which includes multiple nodes that communicate with each other. A blockchain is an example of a decentralized database, which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve crypto-currencies and use consensus based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications, which leverage tamper-proof properties of the shared or distributed ledger (which may be in the form of a blockchain) and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry-proposals to an ordering service (e.g., ordering node). Another type of node is a peer node, which can receive client submitted entries, commit the entries and maintain a state and a copy of the ledger of blockchain entries. Peers can also have the role of an endorser. An ordering-service-node or orderer is a node running the communication service for all nodes, and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a service to a particular vehicle and/or a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the transport, the exterior of the transport, on a fixed object apart from the transport, and on another transport proximate the transport. The sensor may also be associated with the transport's speed, the transport's braking, the transport's acceleration, fuel levels, service needs, the gear-shifting of the transport, the transport's steering, and the like. A sensor, as described herein, may also be a device, such as a wireless device in and/or proximate to the transport. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach could not be implemented on a traditional centralized database.

Various driving systems of the instant solution can utilize software, an array of sensors as well as machine learning functionality, light detection and ranging (LIDAR) projectors, radar, ultrasonic sensors, etc. to create a map of terrain and road that a transport can use for navigation and other purposes. In some embodiments, GPS, maps, cameras, sensors and the like can also be used in autonomous vehicles in place of LIDAR.

The instant solution includes, in certain embodiments, authorizing a vehicle for service via an automated and quick authentication scheme. For example, driving up to a charging station or fuel pump may be performed by a vehicle operator or an autonomous transport and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record. A blockchain may be used for storing transport-related data and transactions.

According to example embodiments, a solution for priority-based energy transfer from a transport to a charging station and/or grid is provided. Providing surplus energy via Vehicle to Grid (V2G) is a helpful function, especially, during times of heavy energy consumption. An electric or hybrid transport may serve as a dynamic energy storage. A priority of the transport based on passengers and/or goods being transported may be taken into consideration when a request is received to provide energy to the grid (e.g., via a charging station, or another node). If a transported cargo is deemed important (i.e., medicinal, perishable, etc.) and/or a destination of passenger(s) is important (e.g., emergency-related, appointment, meeting, flight, train, etc.), the transport may not be used for energy transfer until such point that the cargo and/or passengers have been tended to. In one embodiment, the transport maintains records of usage and transfers on a local storage either on-board or off-board of the transport. Once a passenger or cargo enters the transport, the record is created on a local storage of the transport. Alternatively, the records may be created on a central server. These records may include properties of the cargo (e.g., cargo type, destination, urgency of delivery, delivery time, etc.) or may include passenger-related data (e.g., destination, urgency, delivery time, etc.). The transport may also record a current energy level and the estimated energy level at cargo or passenger delivery. Based on this data, a current priority level may be assigned to the transport. Conversely, a transport taking passenger to the airport, to a doctor's office or to an important meeting may be assigned a high priority even if the transport has a large amount of surplus energy. Once the transport completes the delivery of cargo or passenger (s), the current energy level is recorded, and the priority level is updated. In one example, the priority level may be calculated by the transport's processor and made available to the server. In another example, the server may get access to the local storage (i.e., record logs) of the transport and may determine the priority level based on the current occupant, cargo etc., on a current location of the transport, a destination of the transport, a future use of the transport, future occupants and/or cargo of the transport, etc.

Priority values and amounts of energy to be transferred may be determined by a server or computer that may be located on-board and/or off-board the transport. A first value may represent the amount of energy to be transferred from a transport to a charging station. A second value may be related to the passengers or cargo of the transport. These values may be weighed against each other to determine an action that the transport should take. Other values can also be considered such a time of day/night, a time to transfer the energy, a value of the energy being transferred, an intermediary and/or final recipient of the energy from the grid, a direct transfer of the energy from the charging station to another transport, a storage of the energy in the charging station and/or grid, etc. If a server receives an energy transfer request from a particular charging station, the server may determine what transports are available with an accessible range. The server may also estimate the efficiency of acquiring energy based on the transport's current distance from the requesting charging station and an energy consumption of the transport. For example, if the server detects several transports within a range of the requesting charging station, the server may first identify the transports that have low priority levels, and hence can be deviated from their trip. Then, the server may calculate the additional energy consumption required for reaching the requesting charging station for each of the transports. The additional energy consumption may be calculated (by a server and/or the transport) based on the known consumption of a particular type of the transport, a location of the transport, on the distance to the charging station, a weight of the transport, road conditions, traffic conditions, weather conditions, etc. Then, the transport(s) that have the lowest amount of the additional energy consumption may be directed to the charging station to make the most efficient surplus energy transfer. In other embodiments, the charging station can perform the steps associated with the server.

According to example embodiments, a comprehensive approach to providing surplus energy from vehicles to a grid via a charging station is disclosed. As discussed herein, the transports may not be indiscriminately routed to a charging station. Instead, the system directs the transports to provide a surplus of energy to the grid if the transport has a low delivery priority (e.g., occupants and/or goods are not urgent for delivery) and will require a minimal amount of additional energy to get to the charging station. This is particularly useful with electric/hybrid vehicles that need to be more intelligent in processing external requests. As such, an ability of the server (or the transport) to weigh priorities and additional energy amount(s) to allow for a more efficient and robust energy conservation is provided.

In one embodiment, transport(s) may be communicably coupled to a server and to charging stations over a blockchain network. The transport(s), the server and the charging stations may serve as blockchain peers. An energy request may be broadcast to several transports within an accessible range of the charging station. The transport(s) and the server node may reach a consensus on which transport is going to provide the energy. Once the server peer receives the consensus from at least one transport, the transport may be directed to the charging station while the other transport(s) are directed away. In another embodiment, one of the other transports may be directed to a location proximate the charging station in the event the transport providing the energy has any issues and/or additional energy is needed. The energy transfer transaction may be recorded on the blockchain for tracking available energy amounts. In one embodiment, each of the blockchain peers (i.e., the server and the transports) maintains its own local copy of the blockchain ledger. This way, the transport peer may execute a smart contract to record each of the transactions on its local ledger. For example, the transport may record a type of cargo or passenger-related data, pickup and delivery locations and times along with its energy level at pickup and at the destination. The energy level at the destination may be estimated based on the known energy consumption for the type of the transport and the distance. Once the delivery is complete, the transport may record the current location and energy level with a timestamp on its local ledger. The priority of the transport may be updated to "low" upon completion of the delivery. This way, the server peer may have the information about the transport that has a "low" priority. If a charging station within an accessible range sends a request for energy transfer, the server may consider the transport based on its current location, energy level and the additional energy consumption required to travel to the requesting charging station, among other factors disclosed herein. The priority level, the location with a timestamp, the transport type and its energy consumption may be acquired by the server peer from the blockchain ledger. The current energy level of the transport has to be sufficient for sharing surplus energy. For example, a certain type of transport can drive locally for 3 days on 50% of energy. If the transport's current energy level is at 75%, the transport can safely transfer up to 25% of its energy to the requesting charging station. Then, if the server peer selects the transport, a consensus for energy transfer should be reached. This consensus may be reached based on the available energy of the transport relative to the requested amount of energy. Once the transport transfers the energy to the charging station, the energy transfer transaction is recorded on the blockchain for payments or energy values (such as energy credits, monetary credits, etc.) to the transport at the later time.

FIG. 1 illustrates a transport network diagram, according to example embodiments. Referring to FIG. 1, the network diagram 100 includes electric (or hybrid) transports 104 and 105 communicably coupled to a server node 112 over a network (not shown). The transports 104 and 105 may be semi or fully autonomous electric transports. The server 112 may be communicably coupled to and may receive a request for energy from one or more of the charging stations 114. The server may detect one or more of the transports 104 and 105 traveling within an accessible range of the requesting charging station 114 and may send a request for energy 132 to these transports upon considering the priorities and additional energy consumption required for the transports 104 and 105 to reach the charging station. The transports 104 and 105 may provide their current priority data to the server 112 as well as their current energy level and/or their prospective energy level and location after their current trip ends. In one example, the transports may provide cargo or passenger-related data to the server 112 to determine their current priority level. If the server 112 deems that the current priority of the transports 104 or 105 is low (i.e., the transport is empty, has non-essential cargo, is traveling on a non-time sensitive task, etc.), the server 112 may instruct the transports 104 or 105 to travel to the requesting charging station 114 or to a closest charging station to transfer the requested amount of energy (or a portion of the requested amount based on the available energy of the transport).

In one embodiment, if the transports 104 and 105 have similar priority, one of the transports may provide a confirmation to the server 112 based on an agreement 134 and 135 (i.e., consensus 138 among the transports within the accessible range). In one example, the server 112 may record that a particular transport has provided the energy to the charging station 114 for future audits and for returning the same amount of energy to this transport at a later point from the charging station 114 (or from a different charging station) and/or from a different energy source (solar, wind, hydro, etc.) or location (home, other transport, etc.) in communication with the server 112.

Figure 2A:
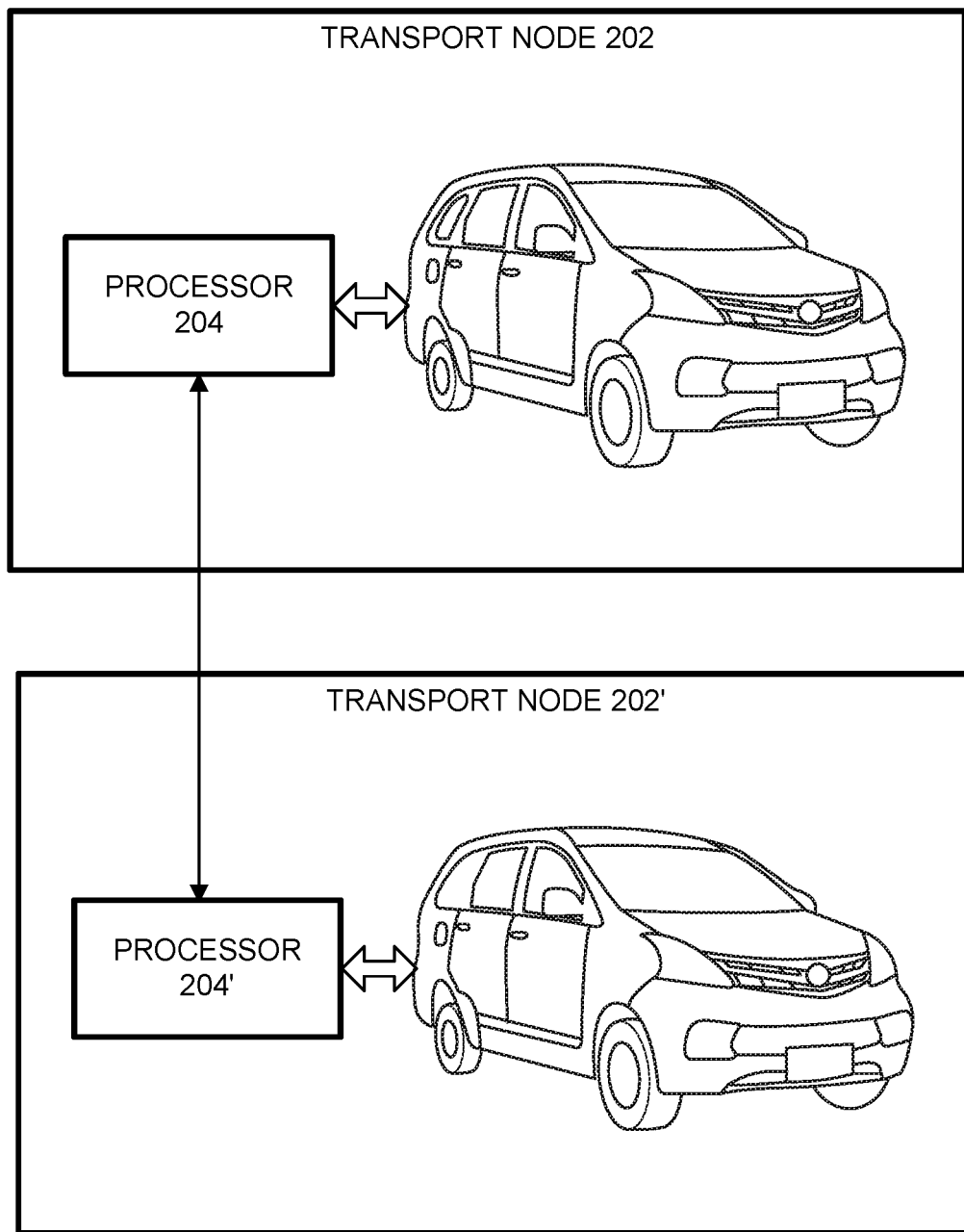
FIG. 2A illustrates a further transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' may communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
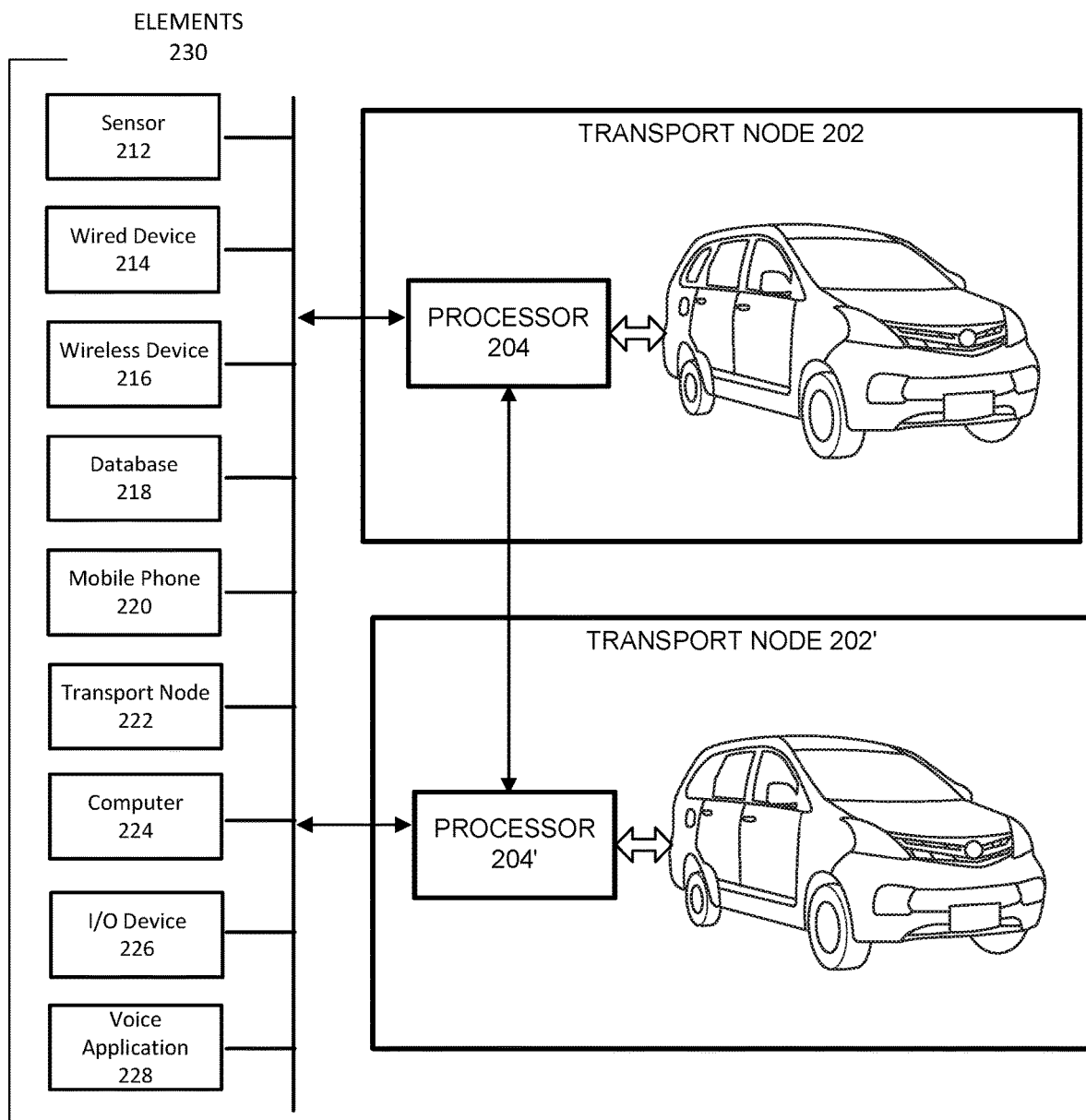
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' may communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204, which may initiate the transport node 202 to take an action, may further provide the information or additional information to the processor 204', which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
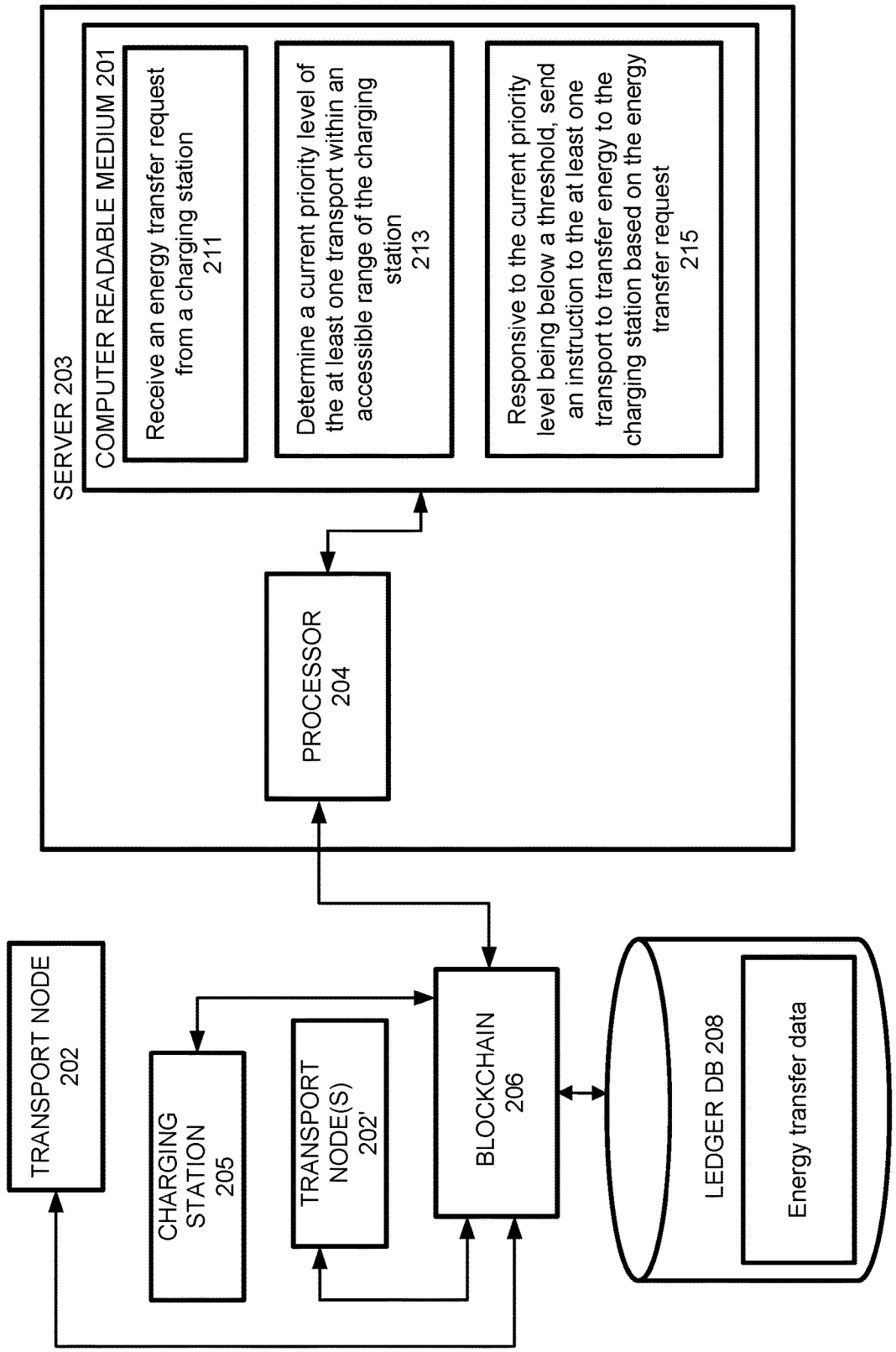
FIG. 2C illustrates an architecture configuration including a blockchain, according to example embodiments.

FIG. 2C illustrates a transport network diagram for priority-based energy transfers from transports to charging stations, according to example embodiments. Referring to FIG. 2C, the network diagram 240 includes a transport node 202 connected to other transport nodes 202' and to a server node 203 over a blockchain network 206. The server 203 may be connected to a charging station 205. The transport nodes 202 and 202' may represent transports/vehicles. The blockchain network 206 may have a ledger 208 for storing energy transfer-related data (i.e., the donor transport ID, the charging station ID, the energy amount, date and time of the transfer, value related to the transfer, etc.). As discussed above, the transport nodes may have their local copies of the blockchain ledger 208. The transports may record their locations with timestamps, current energy levels at pickup and delivery, etc.). A copy of the ledger database 208 may reside on the server 203, on one or more of the transport node(s) 202, 202' and/or on another blockchain node (not shown). The charging station 114 (see FIG. 1) may be communicably coupled to the blockchain 206 and may have its own local ledger for tracking all energy transfers.

While this example describes one server node 203, multiple such nodes may be connected to the blockchain 206. It should be understood that the server node 203 may include additional components and that some of the components described herein may be removed and/or modified without departing from a scope of instant application. The server node 203 may be a computing device, a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the server node 203 may include multiple processors, multiple cores, or the like, without departing from the scope of the instant application.

The server node 203 may also include a non-transitory computer readable medium 201 that may have stored thereon machine-readable instructions executable by the processor 204. Examples of the machine-readable instructions are shown as steps 211-215 and are further discussed below. Examples of the non-transitory computer readable medium 201 may include an electronic, magnetic, optical, or other physical storage device that contains or stores executable instructions. For example, the non-transitory computer readable medium 201 may be a Random Access memory (RAM), an Electrically Erasable Programmable Read-Only Memory (EEPROM), a hard disk, an optical disc, or other type of storage device. The processors and/or computer readable media may fully or partially reside on and/or off the transport nodes 202, 202'. The steps or features stored in the computer readable media may be fully or partially performed by any of the processors and/or elements depicted and/or described herein in any order and may further be combined.

The processor 204 may execute the machine-readable instructions 211 to receive an energy transfer request from a charging station 205. Each of the transports 202 and 202' may serve as a network node on the blockchain network 206. The blockchain 206 network may be configured to use one or more smart contracts located on the transports (i.e., nodes) that may manage transactions for participating nodes 202 and 202'. The processor 204 may execute the machine-readable instructions 213 to determine a current priority level of the at least one transport 202/202' within an accessible range of the charging station 205. The processor 204 may execute the machine-readable instructions 215 to, responsive to the current priority level being below a threshold, send an instruction to the at least one transport 202, 202' to transfer energy to the charging station 205 based on the energy transfer request. As discussed above, the priority level may be determined based on transport occupant's data (e.g., urgency of the trip, destination and schedule) or based on transport cargo properties (perishability, scheduled delivery, etc.). Additionally, one or more steps or features may be added, omitted, combined, performed at a later time, etc.

Figure 3A:
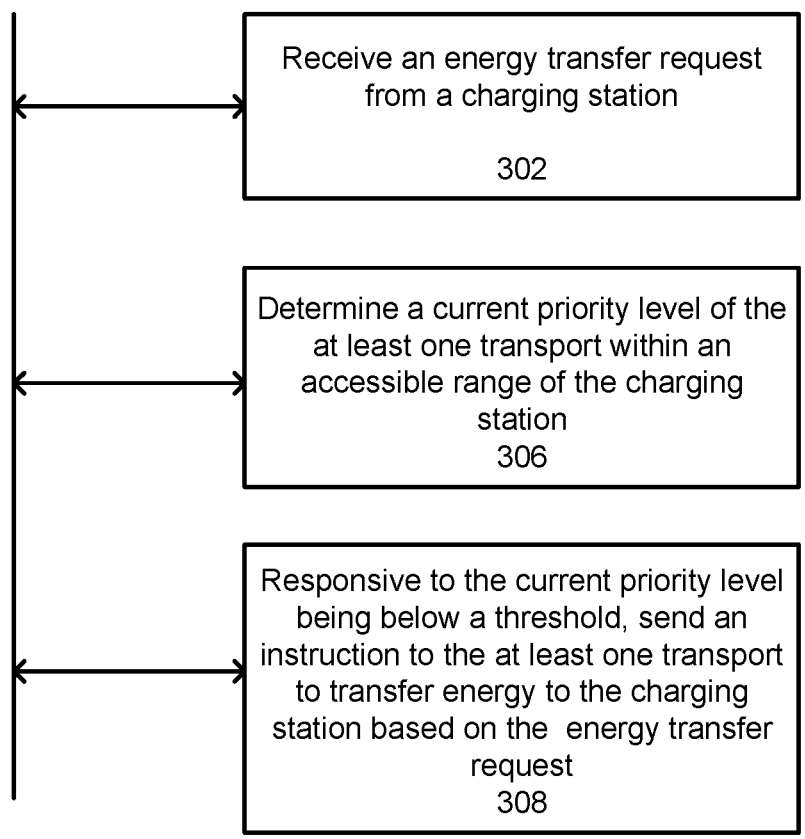
FIG. 3A illustrates a flow diagram, according to example embodiments.

FIG. 3A illustrates a flow diagram 300 of a method, according to example embodiments. Referring to FIG. 3A, an example method may be executed by the server node 203 (see FIG. 2C). It should be understood that method 300 depicted in FIG. 3A may include additional operations and that some of the operations described therein may be removed and/or modified without departing from the scope of instant application. The description of the method 300 is also made with reference to the features depicted in FIG. 2C for purposes of illustration. Particularly, the processor 204 of the server node 203 may execute some or all of the operations included in the method 300.

With reference to FIG. 3A, at block 302, the processor 204 may receive an energy transfer request from a charging station. At block 306, the processor 204 may determine a current priority level of the at least one transport within an accessible range of the charging station. At block 308, the processor 204 may, responsive to the current priority level being below a threshold, send an instruction to the at least one transport to transfer energy to the charging station based on the energy transfer request.

Figure 3B:
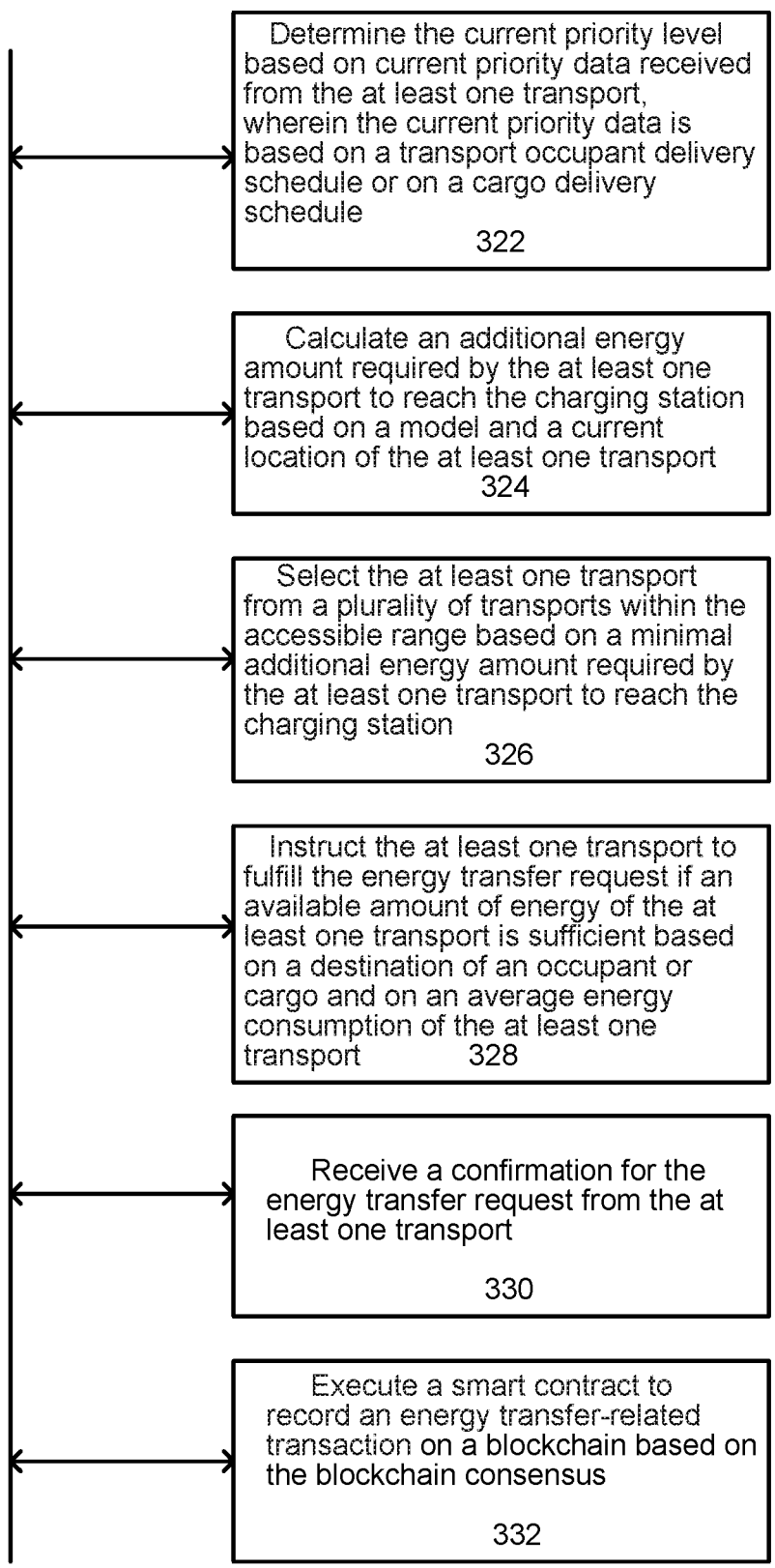
FIG. 3B illustrates another flow diagram, according to example embodiments.

FIG. 3B illustrates a flow diagram 320 of an example method, according to example embodiments. Referring to FIG. 3B, the method 320 may also include one or more of the following steps. At block 322, the processor 204 may determine the current priority level based on current priority data received from the at least one transport. The current priority data may be based on a transport occupant delivery schedule or on a cargo delivery schedule. At block 324, the processor 204 may calculate an additional energy amount required by the at least one transport to reach the charging station based on a type and a current location of the at least one transport. At block 326, the processor 204 may select the at least one transport from a plurality of transports within the accessible range based on a minimal additional energy amount required by the at least one transport to reach the charging station. At block 328, the processor 204 may instruct the at least one transport to fulfill the energy transfer request if an available amount of energy of the at least one transport is sufficient based on a destination of an occupant or cargo and on an average energy consumption of the at least one transport. At block 330, the processor 204 may receive a confirmation for the energy transfer request from the at least one transport. Note that the confirmation may be a blockchain consensus between peers represented by the at least one transport and by the server. At block 332, the processor 204 may execute a smart contract to record an energy transfer-related transaction on a blockchain based on the blockchain consensus. The energy transfer-related transaction records may be used for efficient management of energy exchange between the transports and charging stations.

Figure 4:
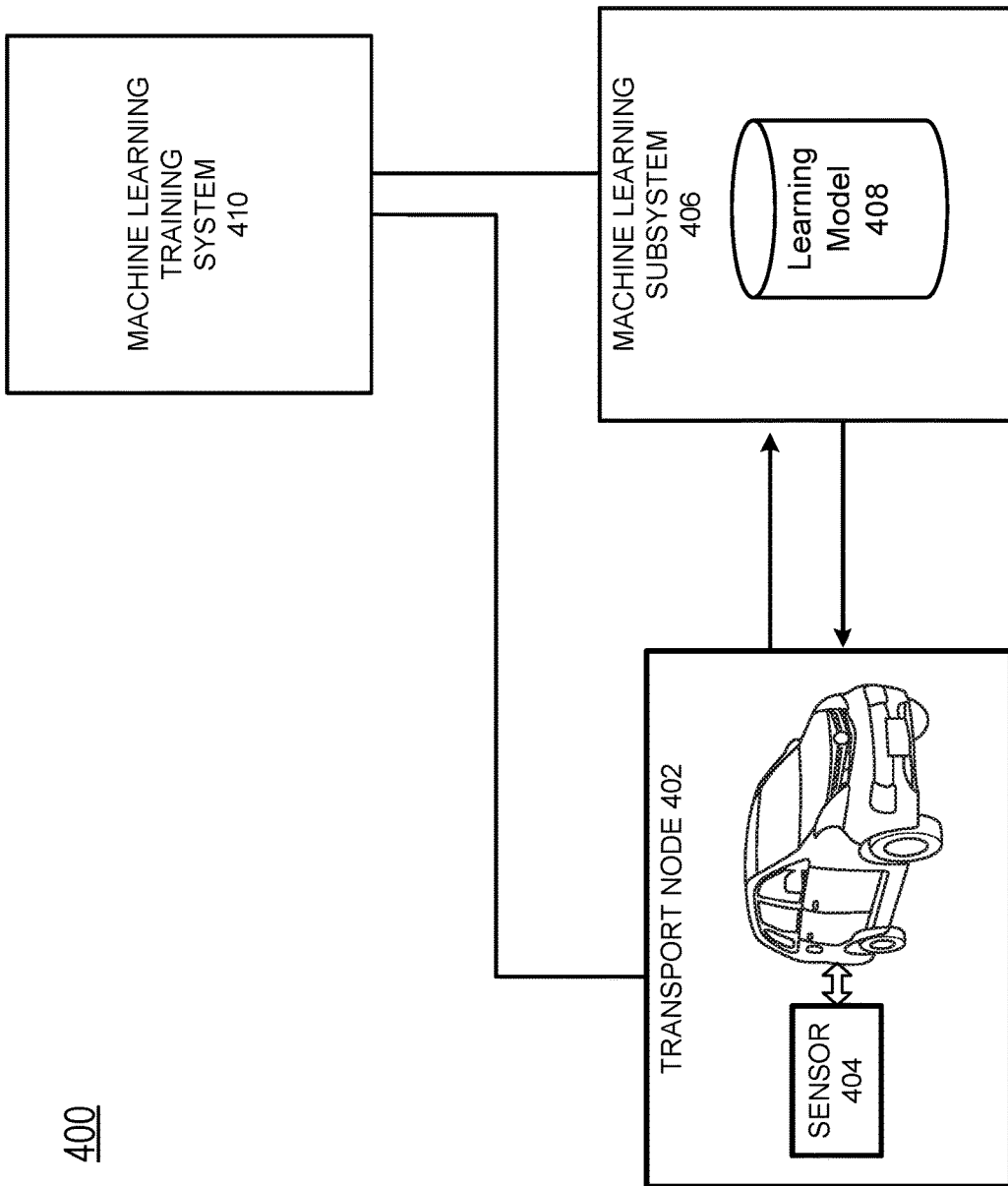
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408, which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408, which returns one or more predictions. The machine learning subsystem 406 sends one or more instructions to the transport node 402 based on the predictions from the learning model 408.

In a further embodiment, the transport node 402 may send the one or more sensor 404 data to the machine learning training system 410. In yet another embodiment, the machine learning subsystem 406 may sent the sensor 404 data to the machine learning subsystem 410. One or more of the applications, features, steps, solutions, etc., described and/or depicted herein may utilize the machine-learning network 400 as described herein.

Figure 5A:
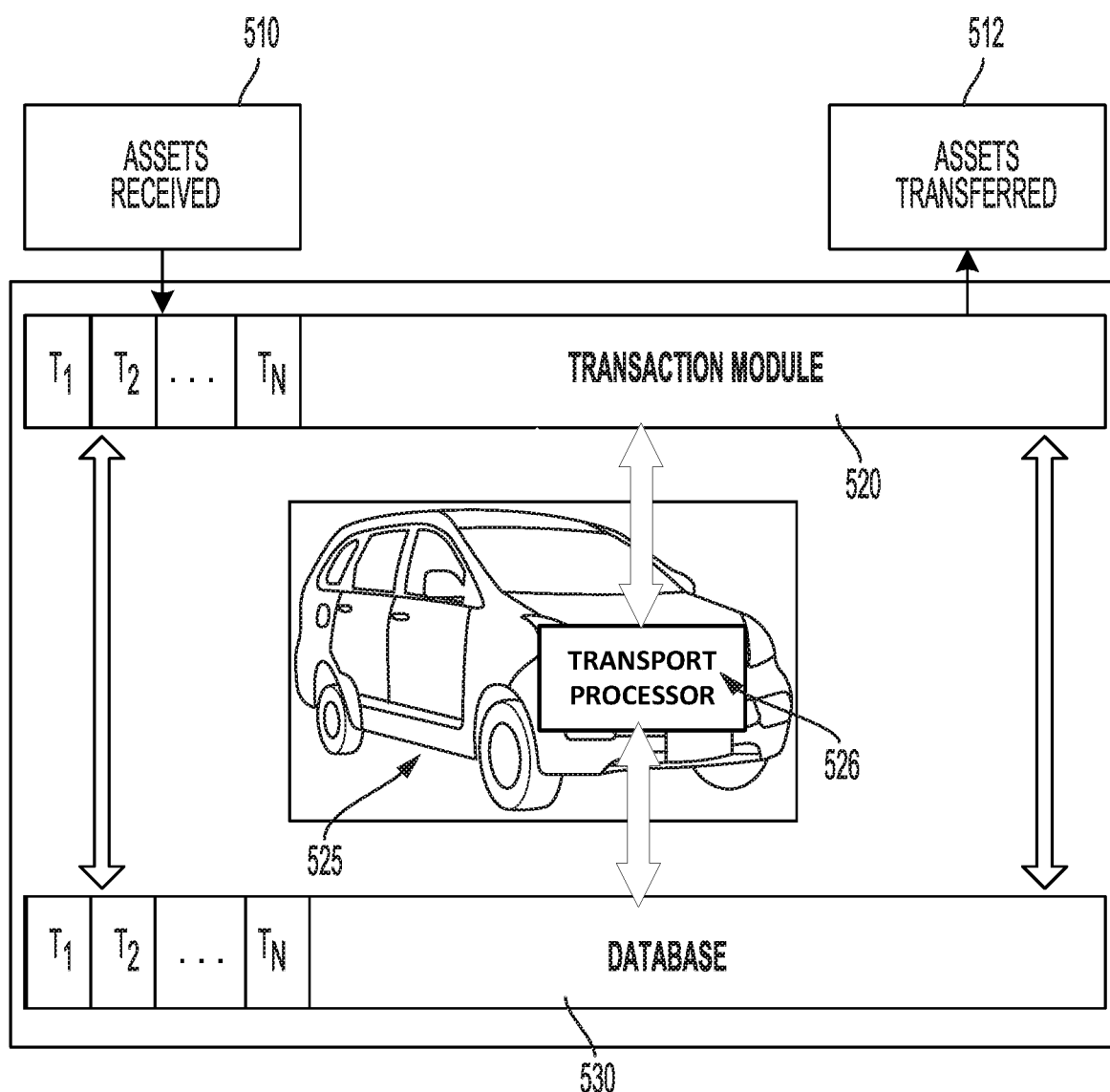
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
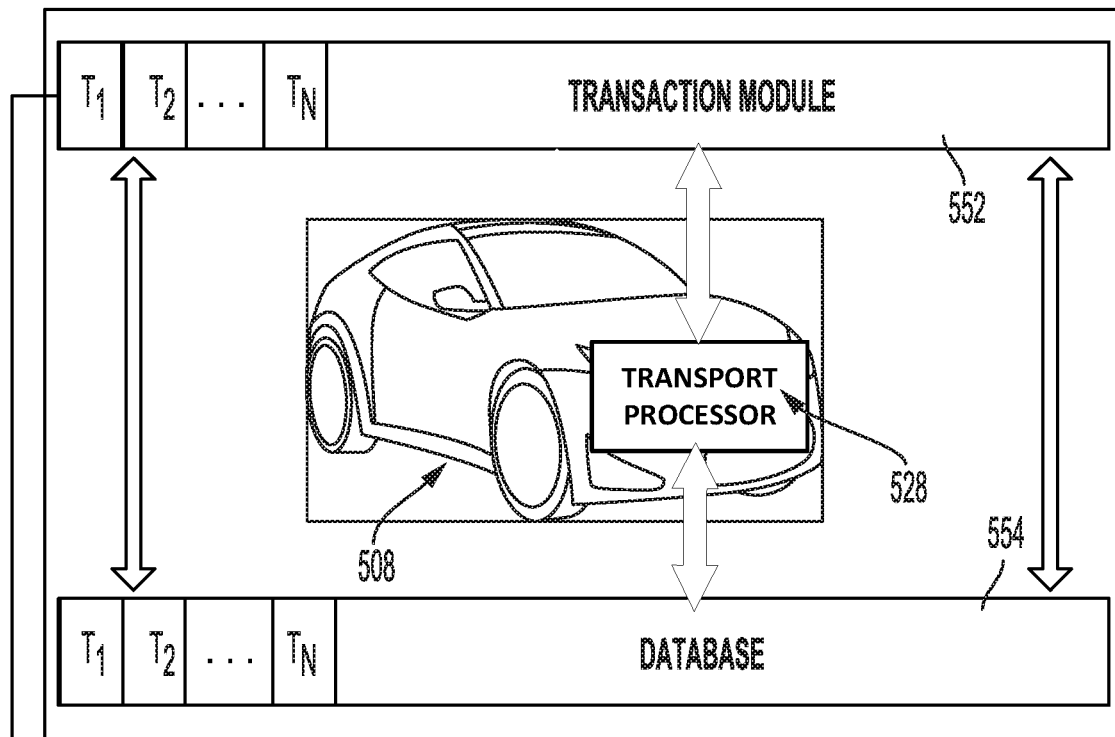
FIG. 5B illustrates another example vehicle configuration for managing database transactions conducted among various vehicles, according to example embodiments
Figure 5B:
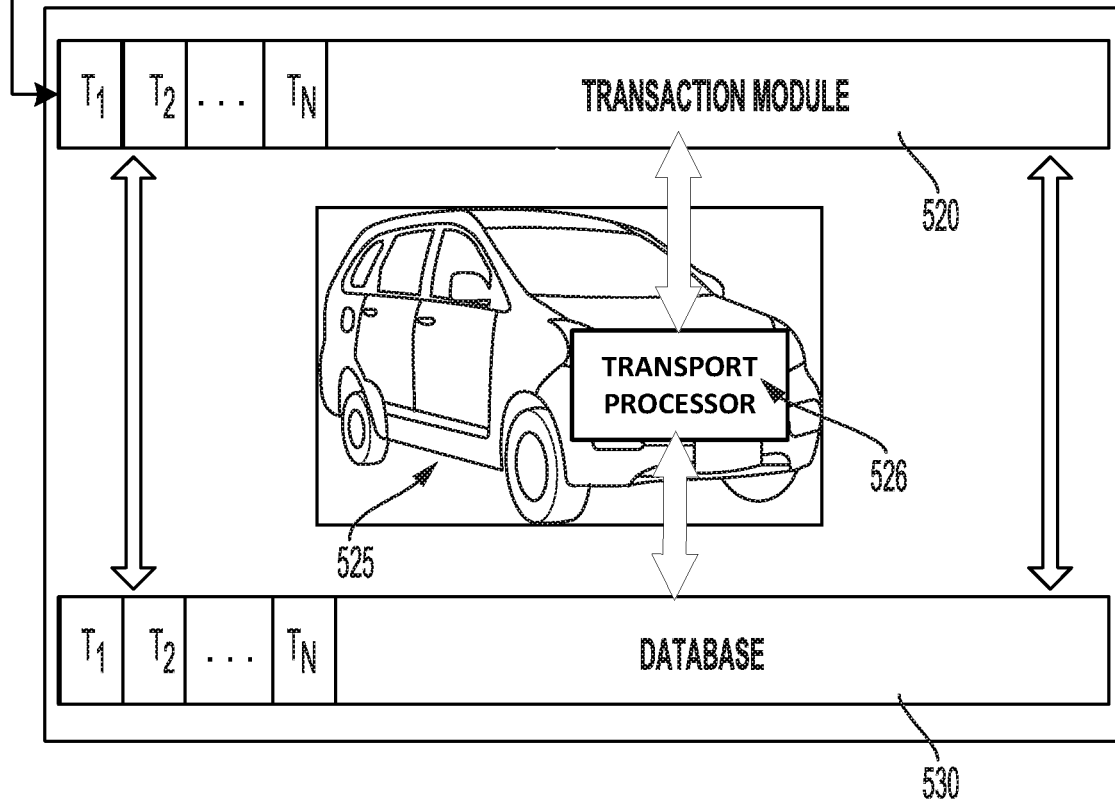

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, a transport processor 528 and the transaction module 552. The vehicle 508 may notify another vehicle 525, which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
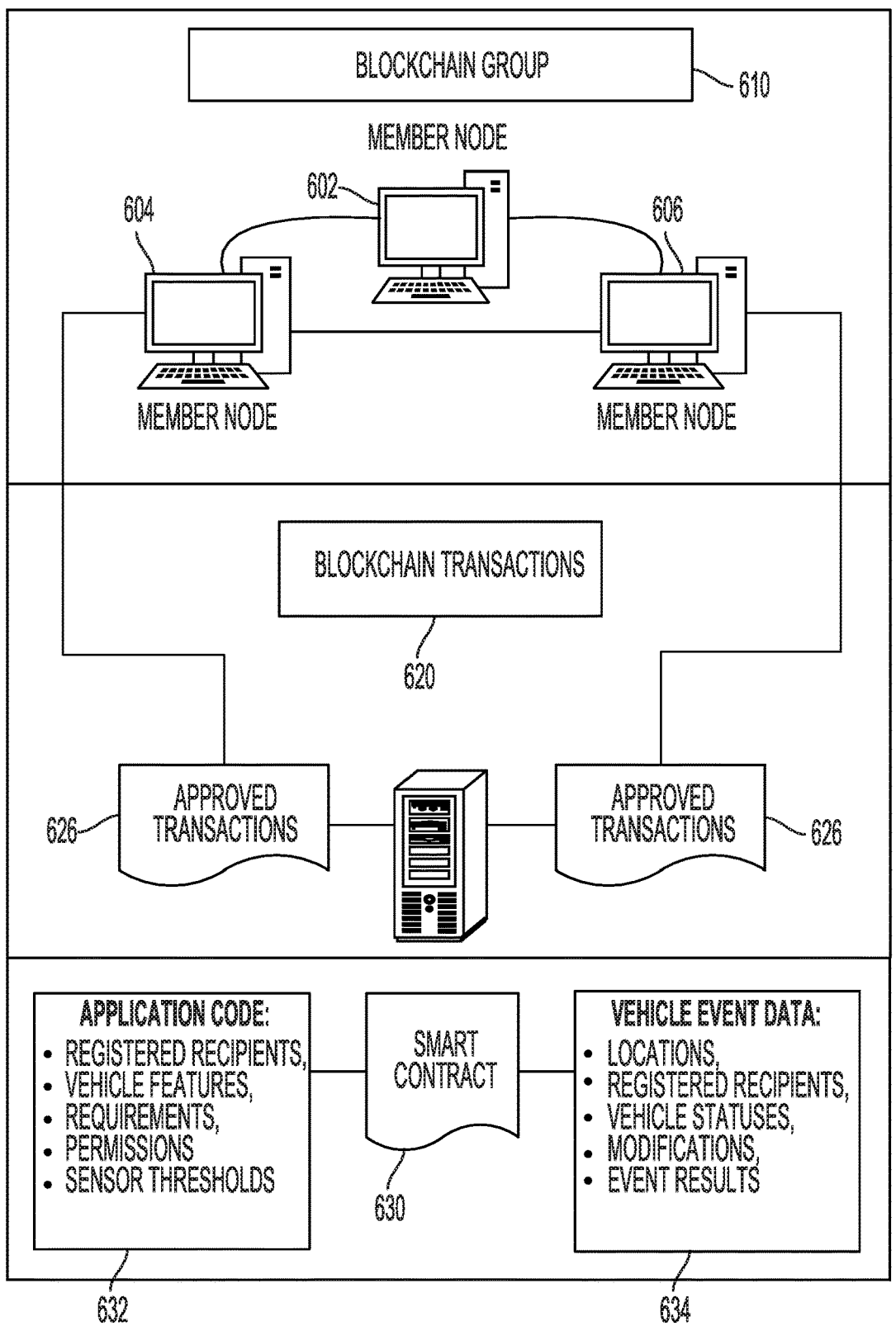
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure, which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
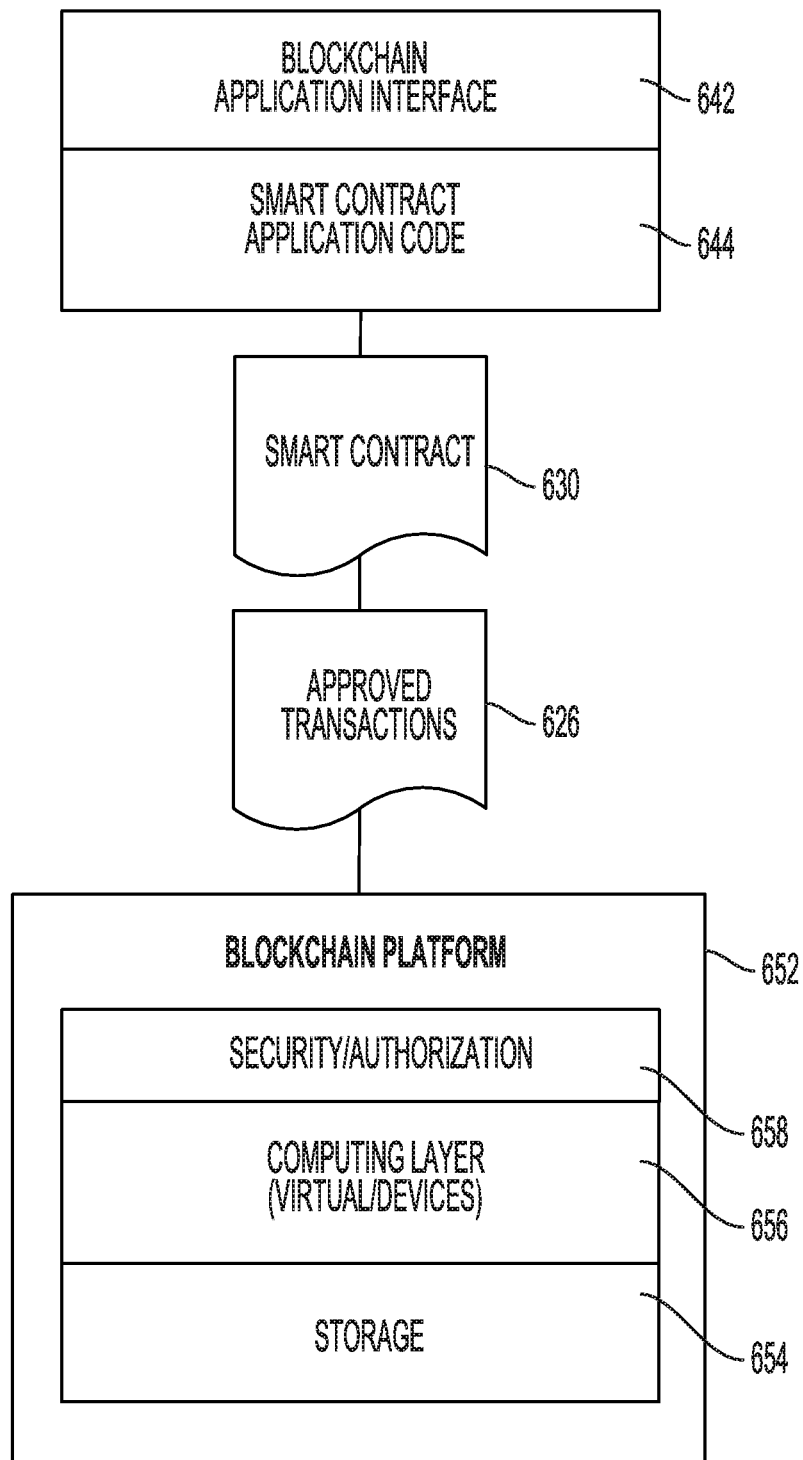
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code, which when executed causes the transaction terms and conditions to become active. The smart contract 630, when executed, causes certain approved transactions 626 to be generated, which are then forwarded to the blockchain platform 652. The platform includes a security/authorization 658, computing devices, which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
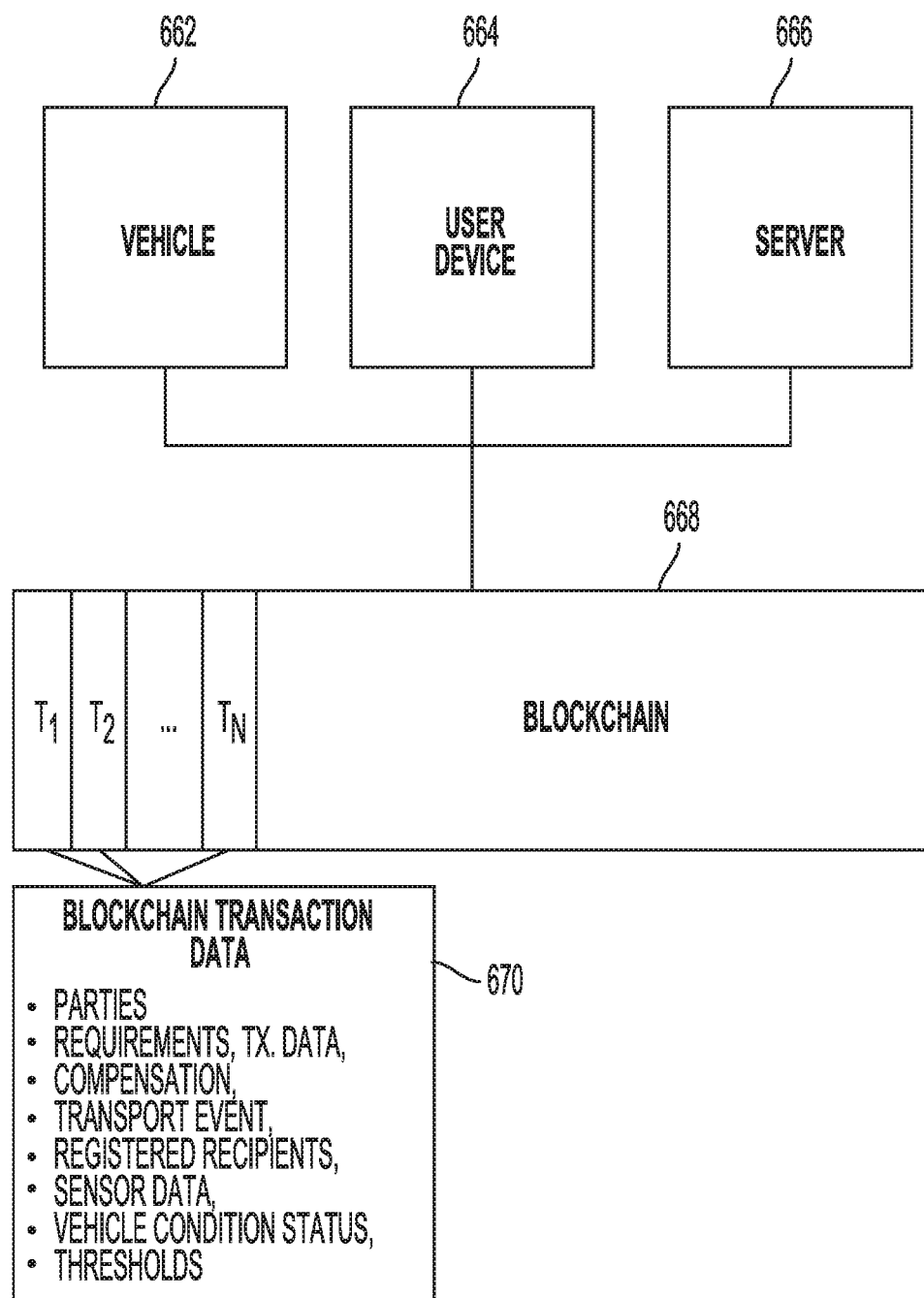
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
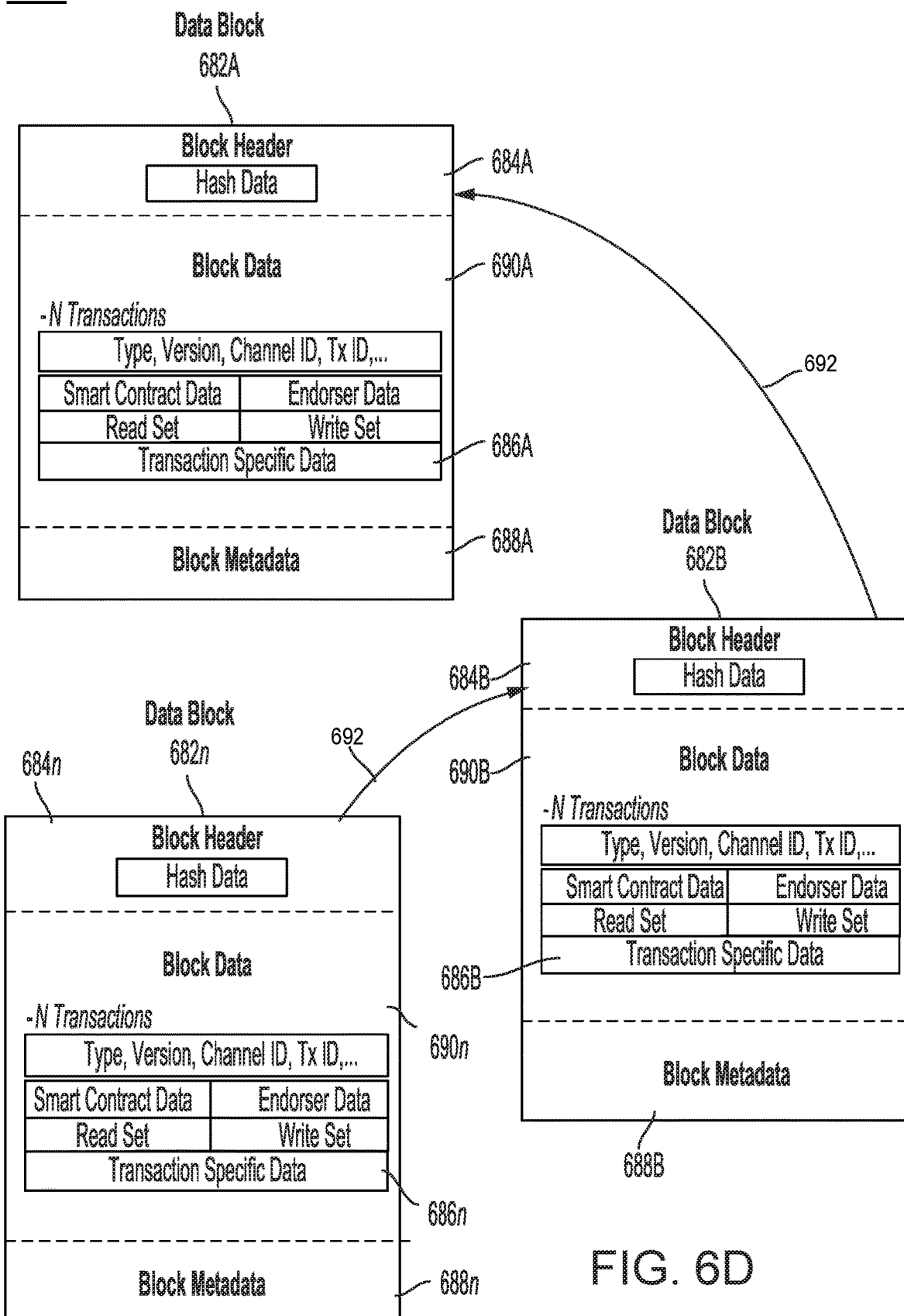
FIG. 6D illustrates example data blocks, according to example embodiments.

FIG. 6D illustrates blockchain blocks 680 that can be added to a distributed ledger, according to example embodiments, and contents of block structures 682A to 682n. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing node(s) creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a crypto-currency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684n, transaction specific data 686A to 686n, and block metadata 688A to 688n. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A, which stores entry data; however, this is not a requirement. The block 682A may store transactional information of N entries (e.g., 100, 500, 1000, 2000, 3000, etc.) within the block data 690A to 690n. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block, which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A, which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 682B to 682n in the blockchain also have headers, files, and values. However, unlike the first block 682A, each of the headers 684A to 684n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
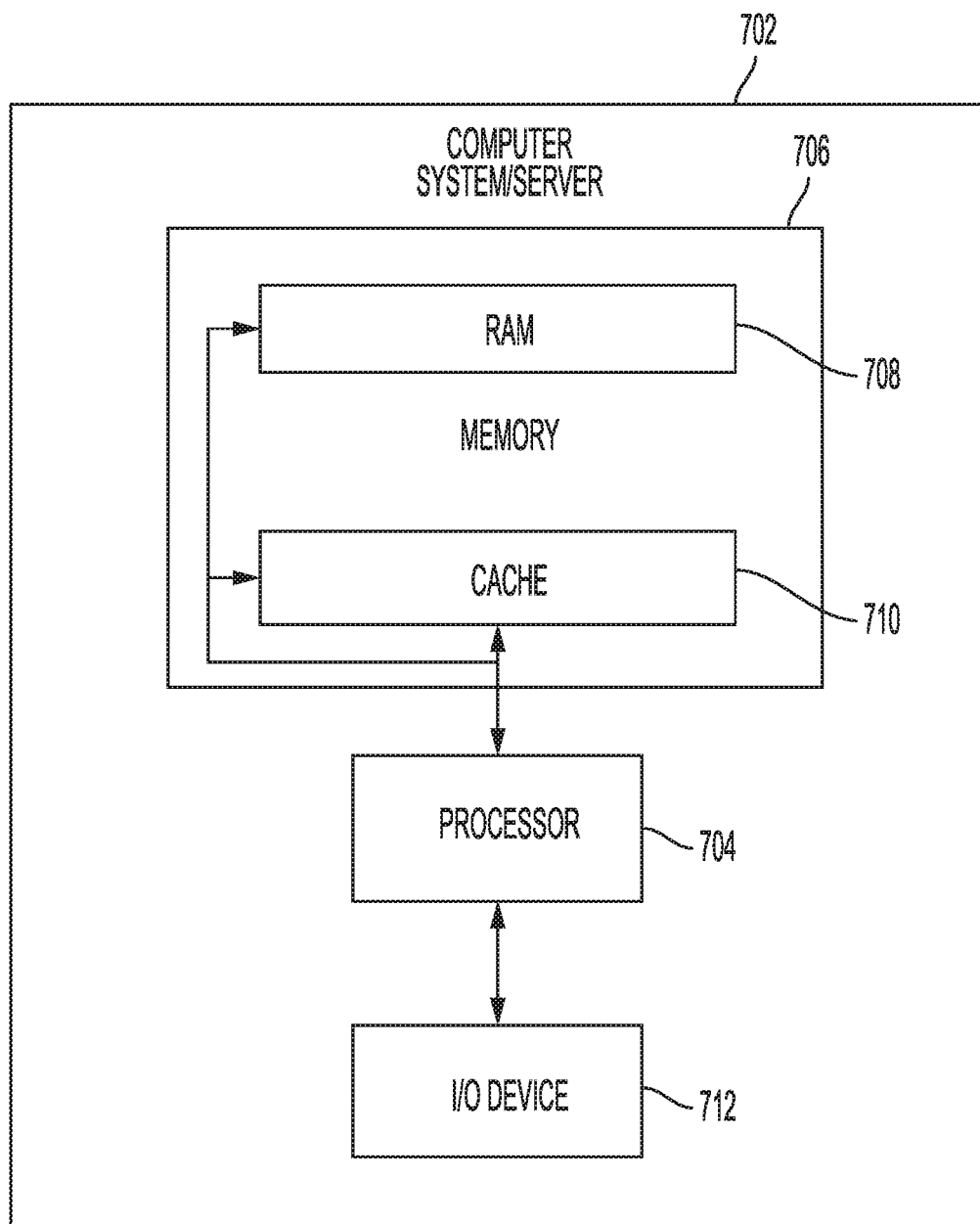
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an example embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent. While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving, by a server, an energy transfer request from a charging station;
   determining, by the server, a current priority level of the at least one transport within an accessible range of the charging station; and
   responsive to the current priority level being below a threshold, sending an instruction to the at least one transport to transfer energy to the charging station based on the energy transfer request;
   wherein the at least one transport is selected from a plurality of transports within the accessible range based on a minimal additional energy amount required by the at least one transport to reach the charging station.

2. The method of claim 1, further comprising determining the current priority level based on current priority data received from the at least one transport, wherein the current priority data is based on transport occupant delivery schedule or on cargo delivery schedule.

3. The method of claim 1, further comprising calculating an additional energy amount required by the at least one transport to reach the charging station based on a type and a current location of the at least one transport.

4. The method of claim 1, further comprising instructing the at least one transport to fulfill the energy transfer request if an available amount of energy of the at least one transport is sufficient based on a destination of an occupant or cargo and on an average energy consumption of the at least one transport.

5. The method of claim 1, further comprising receiving a confirmation for the energy transfer request from the at least one transport, wherein the confirmation comprises a blockchain consensus between peers represented by the at least one transport and by the server.

6. The method of claim 5, further comprising executing a smart contract to record an energy transfer-related transaction on a blockchain based on the blockchain consensus.

7. A system, comprising:
   a processor of a server;
   a memory on which are stored machine readable instructions that when executed by the processor, cause the processor to:
      receive an energy transfer request from a charging station;
      determine a current priority level of the at least one transport within an accessible range of the charging station; and
      responsive to the current priority level being below a threshold, send an instruction to the at least one transport to transfer energy to the charging station based on the energy transfer request;
   wherein the at least one transport is selected from a plurality of transports within the accessible range based on a minimal additional energy amount required by the at least one transport to reach the charging station.

8. The system of claim 7, wherein the instructions are further to cause the processor to determine the current priority level based on current priority data received from the at least one transport, wherein the current priority data is based on a transport occupant delivery schedule or on a cargo delivery schedule.

9. The system of claim 7, wherein the instructions are further to cause the processor to calculate an additional energy amount required by the at least one transport to reach the charging station based on a type and a current location of the at least one transport.

10. The system of claim 7, wherein the instructions are further to cause the processor to instruct the at least one transport to fulfill the energy transfer request if an available amount of energy of the at least one transport is sufficient based on a destination of an occupant or cargo and on an average energy consumption of the at least one transport.

11. The system of claim 7, wherein the instructions are further to cause the processor to receive a confirmation for the energy transfer request from the at least one transport, wherein the confirmation comprises a blockchain consensus between peers represented by the at least one transport and by the server.

12. The system of claim 11, wherein the instructions are further to cause the processor to execute a smart contract to record an energy transfer-related transaction on a blockchain based on the blockchain consensus.

13. A non-transitory computer readable medium comprising instructions, that when read by a processor, cause the processor to perform:
   receiving an energy transfer request from a charging station;
   determining a current priority level of the at least one transport within an accessible range of the charging station; and
   responsive to the current priority level being below a threshold, sending an instruction to the at least one transport to transfer energy to the charging station based on the energy transfer request;
   wherein the at least one transport is selected from a plurality of transports within the accessible range based on a minimal additional energy amount required by the at least one transport to reach the charging station.

14. The non-transitory computer readable medium of claim 13, further comprising instructions, that when read by a processor, cause the processor to determine the current priority level based on current priority data received from the at least one transport, wherein the current priority data is based on a transport occupant delivery schedule or on a cargo delivery schedule.

15. The non-transitory computer readable medium of claim 13, further comprising instructions, that when read by a processor, cause the processor to calculate an additional energy amount required by the at least one transport to reach the charging station based on a type and a current location of the at least one transport.

16. The non-transitory computer readable medium of claim 13, further comprising instructions, that when read by a processor, cause the processor to instruct the at least one transport to fulfill the energy transfer request if an available amount of energy of the at least one transport is sufficient based on a destination of an occupant or cargo and on an average energy consumption of the at least one transport.

17. The non-transitory computer readable medium of claim 13, further comprising instructions, that when read by a processor, cause the processor to receive a confirmation for the energy transfer request from the at least one transport, wherein the confirmation comprises a blockchain consensus between peers represented by the at least one transport and by the server.

18. The non-transitory computer readable medium of claim 17, further comprising instructions, that when read by a processor, cause the processor execute a smart contract to record an energy transfer-related transaction on a blockchain based on the blockchain consensus.

* * * * *